United States Patent
Wang

(10) Patent No.: US 10,707,591 B2
(45) Date of Patent: Jul. 7, 2020

(54) ALUMINUM TERMINAL AND COPPER-ALUMINUM TRANSITION CONNECTOR

(71) Applicant: JILIN ZHONG YING HIGH TECHNOLOGY CO., LTD, Changchun (CN)

(72) Inventor: Chao Wang, Changchun (CN)

(73) Assignee: JILIN ZHONG YING HIGH TECHNOLOGY CO., LTD, Changchun (CN)

( * ) Notice: Subject to any disclaimer, the term of this patent is extended or adjusted under 35 U.S.C. 154(b) by 0 days.

(21) Appl. No.: 16/346,113

(22) PCT Filed: Oct. 25, 2017

(86) PCT No.: PCT/CN2017/107579
§ 371 (c)(1),
(2) Date: Apr. 30, 2019

(87) PCT Pub. No.: WO2018/082486
PCT Pub. Date: May 11, 2018

(65) Prior Publication Data
US 2019/0260145 A1    Aug. 22, 2019

(30) Foreign Application Priority Data
Nov. 4, 2016    (CN) .......................... 2016 1 0966186

(51) Int. Cl.
*H01R 4/62*    (2006.01)
*H01R 4/20*    (2006.01)
(Continued)

(52) U.S. Cl.
CPC .............. *H01R 4/625* (2013.01); *H01R 4/20* (2013.01); *H01R 4/62* (2013.01); *H01R 11/12* (2013.01);
(Continued)

(58) Field of Classification Search
CPC ................................ H01R 46/62; H01R 11/12
See application file for complete search history.

(56) References Cited

U.S. PATENT DOCUMENTS 2,480,280 A * 8/1949 Bergan .................... H01R 4/203
439/882
3,895,851 A * 7/1975 Bolton ...................... H01R 4/62
439/387
(Continued)

FOREIGN PATENT DOCUMENTS

AU    2008258184 B2    12/2009
CN      1568561 A       1/2005
(Continued)

OTHER PUBLICATIONS

Mtr Mecatraction: "Mecatraction MTR Catalogue connectors", Dec. 31, 2010, pp. 1-56.

*Primary Examiner* — Tho D Ta
(74) *Attorney, Agent, or Firm* — Bayramoglu Law Offices LLC

(57) ABSTRACT

An aluminum terminal includes an insertion cavity for inserting the aluminum wire. The insertion cavity includes a first cavity with an inner diameter matching with an outer diameter of the conductor core of the aluminum wire, and a second cavity with an inner diameter matching with an outer diameter of the insulation layer of the aluminum wire. The rear end of the first cavity is connected to the front end of the second cavity. The minimum wall thickness of the insertion cavity is not less than ⅙ times the wall thickness of the insulation layer. The copper-aluminum transition connector includes the copper terminal and at least one aluminum terminal. The copper terminal is fixed on the front end of the first cavity of the aluminum terminal.

16 Claims, 10 Drawing Sheets

(51) Int. Cl.
H01R 11/12 (2006.01)
H01R 13/10 (2006.01)
H01R 11/09 (2006.01)

(52) U.S. Cl.
CPC .............. *H01R 13/10* (2013.01); *H01R 11/09* (2013.01); *H01R 2201/26* (2013.01)

(56) References Cited

U.S. PATENT DOCUMENTS

| | | | |
|---|---|---|---|
| 4,312,793 A | 1/1982 | Charneski et al. | |
| 6,538,203 B1 * | 3/2003 | Nolle | H01R 4/62 174/84 C |
| 7,597,596 B2 * | 10/2009 | Watanabe | H01R 4/183 439/877 |
| 8,519,267 B2 * | 8/2013 | Peters | H01R 4/203 174/122 C |
| 9,444,212 B2 * | 9/2016 | Tachibana | H01R 4/62 |
| 9,985,362 B2 * | 5/2018 | Arenburg | H01R 4/70 |
| 10,164,348 B2 * | 12/2018 | Peters | H01R 4/203 |
| 2003/0194916 A1 | 10/2003 | Quesnel et al. | |
| 2004/0053542 A1 * | 3/2004 | Gloaguen | H01R 4/20 439/877 |
| 2006/0102375 A1 * | 5/2006 | Tamm | H01R 4/20 174/84 C |

FOREIGN PATENT DOCUMENTS

| | | |
|---|---|---|
| CN | 201584516 U | 9/2010 |
| CN | 102148072 A | 8/2011 |
| CN | 202474268 U | 10/2012 |
| CN | 202513307 U | 10/2012 |
| CN | 103326142 A | 9/2013 |
| CN | 103354308 A | 10/2013 |
| CN | 203312469 U | 11/2013 |
| CN | 104638392 A | 5/2015 |
| CN | 105308804 A | 2/2016 |
| CN | 105588317 A | 5/2016 |
| CN | 106450868 A | 2/2017 |
| CN | 206195014 U | 5/2017 |
| EP | 1032077 A2 | 8/2000 |
| JP | 2010257719 A | 11/2010 |
| JP | 2014146609 A | 8/2014 |

* cited by examiner

ALUMINUM TERMINAL AND COPPER-ALUMINUM TRANSITION CONNECTOR

CROSS REFERENCE TO THE RELATED APPLICATIONS

This application is the national phase entry of International Application No. PCT/CN2017/107579, filed on Oct. 25, 2017, which is based upon and claims priority to Chinese Patent Application No. 201610966186.5, filed on Nov. 4, 2016, the entire contents of which are incorporated herein by reference.

TECHNICAL FIELD

The present invention relates to an aluminum terminal used in a copper-aluminum transition connector for an automotive vehicle and a copper-aluminum transition connector using the described aluminum terminal.

BACKGROUND

The connection terminals of electrical apparatus, especially electrical apparatus for automotive vehicles, are usually made of copper. A direct connection of these connection terminals and aluminum wires (which includes a conductor core and an insulation layer wrapped over the conductor core, and the conductor core is mainly made of aluminum or aluminum alloy) will result in a large contact resistance. Under a long-term operation, an overloading, or a short circuit of the apparatus, an acute temperature rise can occur on the connection joint, and thus causes accidents. To this end, a pre-treated copper-aluminum connector or a copper-aluminum transition bus bar is generally used in practice.

A Chinese Utility Model Patent CN 203312469 U discloses a copper-aluminum joint, which mainly plays a role of transitional connector between electrical apparatus and aluminum wires. The elements involved in the transitional connector mainly include aluminum wire, aluminum ferrule, and copper terminal. Specifically, the aluminum wire consists of a conductor core and an insulation layer wrapped over the conductor core. The aluminum ferrule is sleeved over the aluminum wires. One end of the aluminum ferrule is placed on the conductor core at the end portion of the aluminum wire where the insulation layer is removed, and the other end of the aluminum ferrule is placed on the adjacent insulation layer. The interior of the aluminum ferrule is of a step shape, and an inner step surface is matched with an end surface of the insulation layer.

However, there is no limitation about the size of the aluminum ferrule for the aluminum-copper joint having such a structure. Since the commonly used aluminum ferrule generally has a yield strength of about 30 MPa, a small wall thickness of the aluminum ferrule when crimped with the aluminum wire will lead to cracks on the aluminum ferrule easily, or obvious cracks may appear after some scratches, thereby degrading the overall mechanical properties of the copper-aluminum joint. While, increasing the wall thickness of the aluminum ferrule contributes very little on improving the crimping performance, mechanical properties, and electrical properties of the product and requires a large amount of aluminum material, which greatly increases the production cost.

Meanwhile, since the aluminum wire is connected to the aluminum ferrule by crimping, if the crimping cannot achieve a good connection, it is easy to leave a gap between the aluminum ferrule and the conductor core of the aluminum wire, or between the conductor cores of the aluminum wire. As a result, it is difficult to isolate air and water, and the conductor core will get oxidized and corroded by air. Thus, the resistance between the conductor core and the aluminum ferrule is increased, and the performance of electrical conductivity between the aluminum wire and the aluminum ferrule is reduced.

SUMMARY

In order to overcome the defects of the prior art, the first objective of the present invention is to provide an aluminum terminal which not only can prevent cracks during the crimping and rationalize the cost of the manufactured product, but also can improve the performance of electrical conductivity between the aluminum terminal itself and the aluminum wire. The second objective of the present invention is to provide a copper-aluminum transition connector using the described aluminum terminal.

To achieve the first objective, the present invention uses the following technical solution which is described in detail.

An aluminum terminal, including an insertion cavity for inserting an aluminum wire. The insertion cavity includes a first cavity with an inner diameter matching with an outer diameter of a conductor core of the aluminum wire, and a second cavity with an inner diameter matching with an outer diameter of an insulation layer of the aluminum wire. A rear end of the first cavity is connected to a front end of the second cavity. A minimum wall thickness of the insertion cavity is not less than $\frac{1}{6}$ times a wall thickness of the insulation layer.

Preferably, a maximum wall thickness of the insertion cavity is not greater than 18 times the wall thickness of the insulation layer.

Preferably, an inner wall of a connection joint of the first cavity and the second cavity is of a chamfered structure.

Preferably, a front end of the first cavity is provided with an opening.

Preferably, an electrically conductive coating layer for allowing an electric conduction between the conductor core and the first cavity is provided between an inner wall of the first cavity and the conductor core.

Further, the electrically conductive coating layer includes at least a 15 wt % of electrically conductive portion and at most an 85 wt % of carrier portion.

Further, the electrically conductive coating layer is mainly composed of a 30-90 wt % of electrically conductive portion and a 10-70 wt % of carrier portion.

Further, the electrically conductive portion includes at least one of gold powder, silver powder, copper powder, aluminum powder, zinc powder, iron powder, cadmium powder, magnesium powder, lithium powder, tin powder, or nickel powder.

Optionally, the electrically conductive portion is mainly composed of graphite powder.

Further, the carrier portion includes a resin matrix and an adhesive.

Further, the carrier portion further includes one or more of a cross-linking agent, a coupling agent, or a dispersing agent.

To achieve the second objective, the present invention uses the following technical solution which is described in detail.

A copper-aluminum transition connector includes a copper terminal and at least one aluminum terminal described above. The copper terminal is fixed on a front end of the first cavity of the aluminum terminal.

Preferably, the copper terminal is welded on the front end of the first cavity.

Further, the copper terminal is fixed on the front end of the first cavity by a friction welding, a resistance welding, a laser welding, an electron beam welding, or a pressure welding.

Preferably, the copper terminal is of a hollow structure.

Further, a connection surface between the copper terminal and the front end of the first cavity is a plane surface.

Optionally, the connection surface between the copper terminal and the front end of the first cavity is a folded surface.

Preferably, at least two aluminum terminals are provided. The aluminum terminals are arranged in a row along a horizontal direction, and side walls of adjacent aluminum terminals are fixedly connected.

Optionally, at least two aluminum terminals are provided. The aluminum terminals are arranged in a row along the horizontal direction, and the adjacent aluminum terminals are separated from each other.

Optionally, the copper terminal has a three-way structure. Three aluminum terminals are provided. The front ends of the first cavities of the three aluminum terminals respectively correspond to three end surfaces of the three-way structure, and each front end of the first cavity is fixedly connected to the corresponding end surface.

Compared with the prior art, the present invention has the following advantages.

1. Based on multiple compression tests and the creative improvements, the inventor got a conclusion that there is a high chance to get cracks on the insertion cavity if the compressive deformation of the aluminum terminal caused by crimping with the aluminum wire is greater than the wall thickness of the insertion cavity itself. Besides, the inventor also found that the compressive deformation range of the insertion cavity during the crimping with the aluminum wire can be effectively controlled and therefore the cracks on the insertion cavity can be avoided, as long as the relationship between the value of the minimum wall thickness of the insertion cavity and the value of the wall thickness of the insulation layer of the aluminum wire is well controlled. In a compression test, a pressure of about 30 MPa is applied to the aluminum terminal. This compression test further proves the inventor's position that if the minimum wall thickness of the insertion cavity is set as $1/7$, $1/8$, $1/9$, $1/10$, $1/11$ or $1/12$ times the wall thickness of the insulation layer of the aluminum wire, obvious cracks appear on the surface of the aluminum terminal of the present invention. While, if the minimum wall thickness of the insertion cavity is set as $1/6$, $1/5$, $1/4$, $1/3$, $1/2$, 1, 2, 3 . . . 15, 18, or 20 times the wall thickness of the insulation layer of the aluminum wire, no crack appear on the surface of the aluminum terminal of the present invention under the same pressure. Therefore, the inventor believes that the cases where the aluminum terminal fractures during the crimping with the aluminum wire can be effectively reduced when the minimum wall thickness of the insertion cavity is set as at least $1/6$ times the wall thickness of the insulation layer.

Meanwhile, in the process that the copper-aluminum connector is formed by the aluminum terminal and the copper terminal, if the minimum wall thickness of the insertion cavity is greater than or equal to the threshold value, i.e. $1/6$ times the wall thickness of the insulation layer, the impact strength of the connection joint of the aluminum terminal and the aluminum wire can be enhanced, thereby further ensuring the performance of the electrical connection therebetween.

2. The maximum wall thickness of the insertion cavity is not greater than 18 times the wall thickness of the insulation layer, so the production cost of the aluminum terminal can be saved while the requirements of the essential electrical properties and crimping performances for the aluminum terminal are satisfied.

3. The inner wall of the connection joint between the first cavity and the second cavity of the insertion cavity is of a chamfered structure. The chamfered structure can avoid obvious cracks on the aluminum terminal in extrusion, and can effectively protect the conductor core and insulation layer from indentations or friction abrasions caused by the right-angle side during compression, so as to avoid the influence on product properties.

4. The electrically conductive coating layer between the inner wall of the first cavity and the conductor core not only improves the electrical contact between the inner wall and the conductor core, but also eliminates air, moisture, and other impurities between the inner wall and the conductor core, so the conductor core is free from being oxidized, and the resistance between the conductor core and the aluminum terminal is reduced. Moreover, the fact that the resistance between the conductor core and the aluminum terminal gets higher as time goes by due to oxidation or other reasons can be avoided, thereby further improving the performance of the electrical conductivity between the aluminum wire and the aluminum terminal.

5. The electrically conductive coating layer includes at least 15 wt % of electrically conductive portion and at most 85 wt % of carrier portion, which can effectively ensure the electrical conductivity performance and the fluidity of the electrically conductive coating layer.

6. The electrically conductive coating layer is mainly composed of 30-90 wt % of electrically conductive portion, and 10-70 wt % of carrier portion. The electrically conductive portion with a proportion of 30-90 wt % is effective in ensuring the performance of the electrical conductivity between the aluminum wire and the aluminum terminal.

7. The electrically conductive portion includes at least one of gold powder, silver powder, copper powder, aluminum powder, zinc powder, iron powder, cadmium powder, magnesium powder, lithium powder, tin powder, or nickel powder, so one can flexibly adjust the composition of the electrically conductive coating layer according to the actual budget. For example, on the basis of satisfying the requirement for electrical conductivity performance, an appropriate reduction of the expensive electrically conductive metal powder can be achieved, so as to save the manufacturing cost.

8. The electrically conductive portion is mainly composed of graphite powder. Compared with the use of metal powders, such as gold powder, silver powder, copper powder, aluminum powder, zinc powder, iron powder, cadmium powder, magnesium powder, lithium powder, tin powder, or nickel powder, as the electrically conductive component recited previously, the use of the graphite powder can greatly lower the manufacturing cost of the electrically conductive portion.

9. The carrier portion includes a resin matrix and an adhesive. The carrier portion further includes one or more of a cross-linking agent, a coupling agent, and a dispersing agent. The resin matrix can effectively bond the electrically conductive portion, and fill the gaps to prevent air, moisture, and impurities between the first cavity and the conductor core. The dispersing agent facilitates the uniform distribution of the electrically conductive portion. The adhesive enhances the bonding between the carrier portion and electrically conductive portion. The cross-linking agent increases the overall strength and elasticity of the electrically conductive coating layer. The coupling agent enhances the bonding among the components of the electrically conductive coating layer.

10. The copper terminal is fixed on the front end of the first cavity of the aluminum terminal by a friction welding, a resistance welding, a laser welding, an electron beam welding, or a pressure welding to manufacture the copper-aluminum transition connector. By doing so, the galvanic cell reaction can be effectively avoided, and the mechanical properties and electrical properties of the copper-aluminum transition connector can be ensured.

11. The copper terminal of the copper-aluminum transition connector has a hollow structure, so with the essential electrically conductive performance satisfied, the copper consumption can be effectively reduced. Thus, besides the reduction of the manufacturing cost of the copper-aluminum transition connector, the copper-aluminum transition terminal can have a lighter weight.

12. In the copper-aluminum transition connector, if the connection surface between the copper terminal and the front end of the first cavity of the aluminum terminal is a plane surface, in the welding process, since the end surfaces of the copper terminal and the aluminum terminal can be easily aligned, the implementation of the welding is easy, and a strong solid joint between the copper terminal and the aluminum terminal can be formed with a lower tendency to cause quality problems of the welding such as welding beads, air holes, etc., which not only greatly decreases the disqualification rate and saves the manufacturing cost, but also improves the safety and reliability of the copper-aluminum transition connector during use.

13. In the copper-aluminum transition connector, if the connection surface between the copper terminal and the front end of the first cavity of the aluminum terminal is a folded surface, the effective contact area between the copper terminal and the aluminum terminal is greatly increased, which ensures a good electrical conductivity performance, enhances the mechanical properties of the copper terminal and the aluminum terminal during welding, and reduces the resistance in the contact surface of the copper terminal and the aluminum terminal.

14. In the copper-aluminum transition connector, at least two or more aluminum terminals can greatly improve the use efficiency of the copper-aluminum connector. The connector can replace multiple terminals for connections in high-current load equipment such as a new-energy vehicle, etc., so it not only can save the space and cost, but also can improve the assembling efficiency.

The above description is merely a summarization of the technical solutions of the present invention. To clarify the technical solutions of the present invention, to be able to implement the technical solutions according to the recitation of the specification, and to clarify the above and other objectives, features, and advantages of the present invention, the preferred embodiments will be described hereinafter with reference to the drawings. The details are as below.

Figure 1:
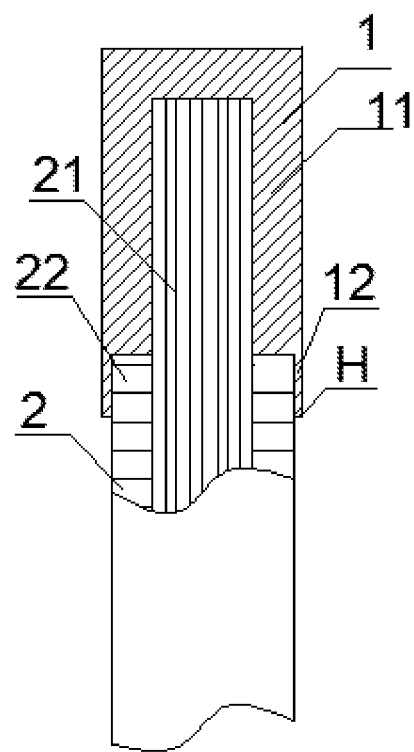
FIG. 1 is a schematic diagram showing a connection structure between an aluminum terminal according to a first preferred embodiment and an aluminum wire of the present invention.

The reference designators in the drawings are described below: 1: aluminum terminal; 11: first cavity; 12: second cavity; 2: aluminum wire; 21: conductor core 22: insulation layer; 3: copper terminal; 31: three-way joint end surface; 32: closed hollow cavity; 4: chamfered structure; 5: entrance for the aluminum wire to pass on the copper terminal; H: minimum wall thickness.

DETAILED DESCRIPTION OF THE EMBODIMENTS

In order to further illustrate the technical solutions used in the present invention to realize the above-mentioned objectives and the functions thereof, the specific embodiments, structures, features, and functions of the present invention will be described in detail hereinafter with reference to the drawings and preferred embodiments. The details are as below.

Aluminum Terminal Structure 1 (with the Right-Angle Structure)

FIG. 1 shows the first structure of the aluminum terminal 1 of the present invention, including the insertion cavity for inserting the aluminum wire 2. The insertion cavity includes the first cavity 11 with an inner diameter matching an outer diameter of the conductor core 21 of the aluminum wire 2, and the second cavity 12 with an inner diameter matching an outer diameter of the insulation layer 22 of the aluminum wire 2. The rear end of the first cavity 11 is connected to the front end of the second cavity 12. The minimum wall thickness H of the insertion cavity is not less than $1/6$ times the wall thickness of the insulation layer.

During installation, the insulation layer 22 at the front end of the aluminum wire 2 is first removed to expose the conductor core 21, and then the aluminum wire 2 is inserted into the insertion cavity. It should be ensured that the exposed portion of the conductor core 21 is located in the first cavity 11, and a part of the remained insulation layer 22 is located in the second cavity 12. After that, a pressure of about 30 MPa is applied to the aluminum terminal 1, so as to crimp and fix the aluminum terminal 1 with the part of aluminum wire 2 located inside it.

It is concluded from multiple compression tests that with a pressure of 30 MPa applied to the aluminum terminal 1 at normal atmospheric pressure, if the minimum wall thickness of the insertion cavity is set as $1/7$, $1/8$, $1/9$, $1/10$, $1/11$ or $1/12$ times the wall thickness of the insulation layer of the aluminum wire, obvious cracks appeared on the surface of the aluminum terminal of the present invention. While, if the minimum wall thickness of the insertion cavity is set as $1/6$, $1/5$, $1/4$, $1/3$, $1/2$, 1, 2, 3 ... 15, 18, or 20 times the wall thickness of the insulation layer of the aluminum wire, under the same pressure, no crack appeared on the surface of the aluminum terminal 1 of the present invention. Therefore, the cases where the aluminum terminal 1 fractures during the crimping with the aluminum wire 2 can be effectively reduced when the minimum wall thickness of the insertion cavity is set as at least $1/6$ times the wall thickness of the insulation layer.

Meanwhile, if the minimum wall thickness H of the insertion cavity is greater than or equal to the threshold value i.e. $1/6$ times the wall thickness of the insulation layer 22, the mechanical strength of the connection joint between the aluminum terminal 1 and the aluminum wire 2 can be ensured when the copper-aluminum connector is formed by the aluminum terminal 1 and the copper terminal 3, thus further ensuring the performance of the electrical connection therebetween.

It should be noted that in the aluminum terminal 1 shown in FIG. 1, the first cavity 11 and the second cavity 12 are of uniform thickness, and the wall thickness of the first cavity 11 is greater than the wall thickness of the second cavity 12. Accordingly, in the present structure, the minimum wall thickness H of the insertion cavity substantially denotes the minimum wall thickness of the second cavity 12 shown in FIG. 1. Obviously, for the persons skilled in the art, the minimum wall thickness H of the insertion cavity should not be limited to the way shown in FIG. 1 as described above. When the wall thickness of the first cavity 11 is equal to the wall thickness of the second cavity 12, the minimum wall thickness H of the insertion cavity is the minimum wall thickness of the first cavity 11 or the minimum wall thickness of the second cavity 12. Optionally, when the wall thickness of the first cavity 11 is smaller than that of the second cavity 12, the minimum wall thickness H of the insertion cavity is the minimum wall thickness of the first cavity 11. Optionally, when the wall thickness of the first cavity 11 and the wall thickness of the second cavity 12 are of gradually varying or stepped type, the minimum wall thickness H of the insertion cavity should be understood as the one with minimum wall thicknesses in the first cavity 11 and the second cavity 12, in this case.

Besides the basis that the aluminum terminal 1 can meet the requirements of the essential electrical performance and crimping performance, the manufacturing cost of the aluminum terminal 1 can be reduced. As a further improvement of the structure of the aluminum terminal 1, the maximum wall thickness of the insertion cavity is not greater than 18 times the wall thickness of the insulation layer 22 (i.e., the maximum wall thickness of the insertion cavity is at most 18 times the wall thickness of the insulation layer 22).

The cross-sections of the first cavity 11 and the second cavity 12 are of rectangular shape. The inner diameter of the first cavity 11 is slightly greater than the outer diameter of the aluminum conductor core 21. The inner diameter of the second cavity 12 is slightly greater than a sum of the diameter of the conductor core 21 and the all thickness of the aluminum wire insulation layer 22.

The conductor core 21 is mainly made of aluminum or aluminum alloy, and the conductor core 21 may be formed by one core wire, or by twisting multiple core wires.

In order to improve the electrical conductivity between the aluminum wire 2 and the aluminum terminal 1, an electrically conductive coating layer (not shown in the drawings) for allowing an electrical conduction between the conductor core 21 and the first cavity 11 is provided between the inner wall of the first cavity 11 and the conductor core 21. With the electrically conductive coating layer, not only the electrical contact between the inner wall of the first cavity 11 and the conductor core 21 can be improved, but also the air, moisture and other impurities between the inner wall and the conductor core 21 can be eliminated to avoid oxidization of the conductor core 21 and reduce the resistance between the conductor core 21 and the aluminum terminal 1. Meanwhile, the electrically conductive coating layer can also avoid the increase of the resistance between the conductor core and the aluminum terminal caused by oxidation or other factors as time goes by. The objective of further improving the electrical conductivity performance between the aluminum wire 2 and the aluminum terminal 1 is therefore achieved.

In order to increase the fluidity of the electrically conductive coating layer, the electrically conductive coating layer includes at least 15 wt % of electrically conductive portion and at most 85 wt % of carrier portion.

In order to uniformly distribute the electrically conductive portion inside the electrically conductive coating layer to ensure the performance of the electrical conductivity between the aluminum wire 2 and the aluminum terminal 1, as a further improvement of the aluminum terminal structure, the electrically conductive coating layer is mainly composed of 30-90 wt % of electrically conductive portion, and 10-70 wt % of carrier portion.

Specifically, the carrier portion includes a resin matrix and an adhesive. The carrier portion further includes one or more of a cross-linking agent, a coupling agent, and a dispersing agent. The resin matrix can effectively bond the electrically conductive portion, and fill the gap to prevent air, moisture, and impurities from leaving between the first cavity 11 and the conductor core 21. The dispersing agent facilitates the uniform distribution of the electrically conductive portion. The adhesive improves the bonding between the carrier portion and electrically conductive portion. The cross-linking agent improves the overall strength and elasticity of the electrically conductive coating layer. And, the coupling agent enhances the combination of components of the electrically conductive coating layer.

As a first preferred component of the electrically conductive portion of the aluminum terminal structure, the electrically conductive portion includes at least one of gold powder, silver powder, copper powder, aluminum powder, zinc powder, iron powder, cadmium powder, magnesium powder, lithium powder, tin powder, or nickel powder.

The following table shows the test results of the electrical conductivity performance of electrically conductive coating layer formed by different kinds of metal powder with electrically conductive components of different ratios.

As one can see in the above table, for the same kind of metal powder, the higher the ratio, the lower the resistivity of the formed electrically conductive coating layer, and the better the electrical conductivity performance between the aluminum wire 2 and the aluminum terminal 1. In contrast, the lower the ratio of the metal powder, the higher the resistivity of the formed electrically conductive coating layer, and the worse the electrical conductivity performance between the aluminum wire 2 and the aluminum terminal 1. In the present table, for the same kind of metal powder, the best electrical conductivity performance can be achieved when the electrically conductive coating layer is formed by the metal powder at a ratio of 100%, while the worst electrical conductivity performance can be achieved when the electrically conductive coating layer is formed by the metal powder at a ratio of 15%.

Among different kinds of metal powders, with the same ratio, Al powder, Mg powder, Zn powder, Cd powder, Fe powder, Sn powder and Ni powder are cheaper. However, since Mg powder is relatively active in air, Fe powder gets oxidized and corroded in the air easily, and Cd powder and Sn powder are of relatively low electrical conductivity performance, so Al powder, Zn powder, or Ni powder is preferred electrically conductive component for reduced manufacturing cost. While, among Ag powder, Cu powder, Au powder, and Li powder, the electrical conductivity performance of the Ag powder, the Cu powder, and the Au powder is better than that of the above-mentioned metal powders. Although the Au powder and Ag powder are chemically stable, they are too expensive to be suitable for the situation where a low manufacturing cost is required. Li powder is expensive while having a relatively common electrical conductivity performance. Cu powder has a good electrical conductivity performance while having a low manufacturing cost. Thus, in the practical manufacturing process, one can flexibly adjust the specific composition of the conductive component of the electrically conductive coating layer according to the actual budget. For example, besides satisfying the requirement for electrical conductivity performance, the use of the expensive electrically conductive portion can be appropriately reduced to save the manufacturing costs.

As a second preferred component of the electrically conductive portion of the aluminum terminal structure, the electrically conductive portion is mainly composed of graphite powder.

The following table shows the test result of electrical conductivity performance of the electrically conductive

| electrically conductive component | resistivity at a ratio of 15%*$10^{-5}$ ($\Omega \cdot m$) | resistivity at a ratio of 30%*$10^{-5}$ ($\Omega \cdot m$) | resistivity at a ratio of 40% *$10^{-5}$ ($\Omega \cdot m$) | resistivity at 57.5% addition level *$10^{-5}$ ($\Omega \cdot m$) | resistivity at a ratio of 60%*$10^{-5}$ ($\Omega \cdot m$) | resistivity at a ratio of 90% *$10^{-5}$ ($\Omega \cdot m$) | resistivity at a ratio of 100% *$10^{-5}$ ($\Omega \cdot m$) |
|---|---|---|---|---|---|---|---|
| Ag | 3.98 | 3.08 | 2.67 | 2.00 | 1.98 | 1.71 | 1.65 |
| Cu | 4.55 | 3.97 | 3.82 | 3.45 | 3.35 | 2.24 | 1.78 |
| Au | 4.57 | 4.22 | 3.99 | 3.77 | 3.65 | 2.96 | 2.44 |
| Al | 4.96 | 4.71 | 4.52 | 3.96 | 3.86 | 3.63 | 2.73 |
| Mg | 6.08 | 5.97 | 5.77 | 5.24 | 5.12 | 4.78 | 4.57 |
| Zn | 7.02 | 6.87 | 6.63 | 6.11 | 5.99 | 5.61 | 5.36 |
| Ni | 9.01 | 8.77 | 8.30 | 7.98 | 7.86 | 7.22 | 6.93 |
| Cd | 9.35 | 8.98 | 8.55 | 8.05 | 7.94 | 7.30 | 6.99 |
| Li | 11.37 | 10.98 | 10.48 | 10.27 | 10.21 | 9.54 | 9.48 |
| Fe | 11.54 | 11.21 | 11.07 | 10.84 | 10.75 | 9.99 | 9.87 |
| Sn | 13.76 | 13.42 | 13.07 | 12.71 | 12.62 | 11.92 | 11.85 | coating layer formed by graphite powder with conductive components of different ratios.

| electrically conductive component | resistivity at a ratio of 15% *10$^{-3}$ ($\Omega \cdot m$) | resistivity at a ratio of 30% *10$^{-3}$ ($\Omega \cdot m$) | resistivity at a ratio of 40% *10$^{-3}$ ($\Omega \cdot m$) | resistivity at a ratio of 57.5% *10$^{-3}$ ($\Omega \cdot m$) | resistivity at a ratio of 60% *10$^{-3}$ ($\Omega \cdot m$) | resistivity at a ratio of 90% *10$^{-3}$ ($\Omega \cdot m$) | resistivity at a ratio of 100% *10$^{-3}$ ($\Omega \cdot m$) |
| --- | --- | --- | --- | --- | --- | --- | --- |
| graphite | 13.08 | 11.97 | 10.11 | 8.56 | 8.47 | 6.97 | 5.25 |

As one can see in the above table, the second preferred component of the electrically conductive portion of the aluminum terminal structure i.e. graphite powder can ultimately form the electrically conductive coating layer with the carrier portion and achieve the corresponding electrically conductive effects. Nonetheless, compared with the above-mentioned first preferred component with the metal powder such as Au powder, Ag powder, Cu powder, Al powder, Zn powder, Fe powder, Cd powder, Mg powder, Li powder, Sn powder, and Ni powder as the electrically conductive portion, the graphite powder has a relatively poor electrical conductivity performance. However, the manufacturing cost of the electrically conductive portion formed by graphite powder is much lower than that of the above-mentioned first preferred component, which can greatly decrease the manufacturing cost of the electrically conductive portion.

Aluminum Terminal Structure 2 (with the Chamfered Structure)

Figure 2:
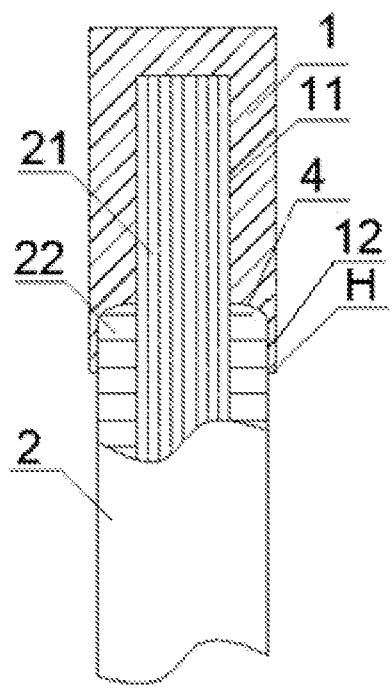
FIG. 2 is a schematic diagram showing a connection structure between an aluminum terminal according to a second preferred embodiment and the aluminum wire of the present invention.

FIG. 2 shows the second structure of the aluminum terminal of the present invention, which is solely different from the first structure shown in FIG. 1 in that the inner wall of the connection joint between the first cavity 11 and the second cavity 12 is of the chamfered structure 4. The chamfered structure 4 can effectively protect the aluminum terminal 1 from obvious cracks when the aluminum terminal 1 is compressed, and protect the core wire 21 and insulation layer 22 from indentations or friction abrasions caused by the right-angle side as shown in FIG. 1 during compression, so as to avoid the influence on product properties.

During installation, the insulation layer 22 at the front end of the aluminum wire 2 is first removed to expose the conductor core 21, and then the aluminum wire 2 is inserted into the insertion cavity.

Aluminum Terminal Structure 3 (with the Opening)

Figure 3:
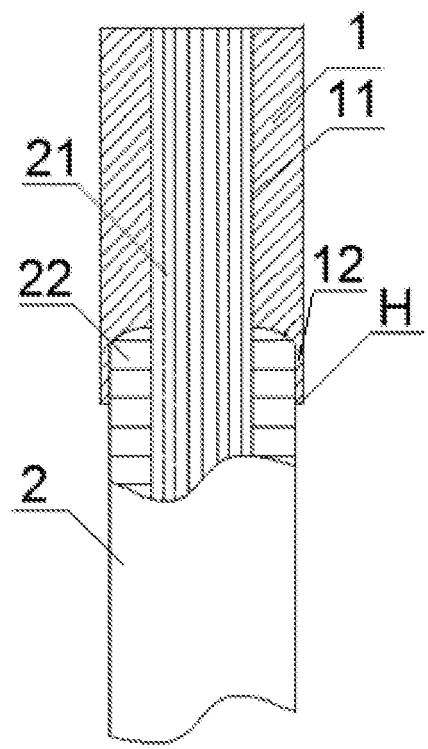
FIG. 3 is a schematic diagram showing a connection structure between an aluminum terminal according to a third preferred embodiment and the aluminum wire of the present invention.

FIG. 3 shows the third structure of the aluminum terminal in the present invention, which is solely different from the second structure shown in FIG. 2 in that the front end of the first cavity 11 is provided with an opening. When the copper-aluminum transition connector is formed, the conductor core 21 of the aluminum wire 2 can pass through the opening and contact the copper terminal 3 to achieve a direct contact with the copper terminal 3.

Besides, the present invention further discloses a copper-aluminum transition connector formed by the above-mentioned aluminum terminal structure. The specific structure of the copper-aluminum transition connector will be further described hereinafter.

Copper-Aluminum Transition Connector Structure 1 (with the Right-Angle Structure and the Plane Surface)

Figure 4:
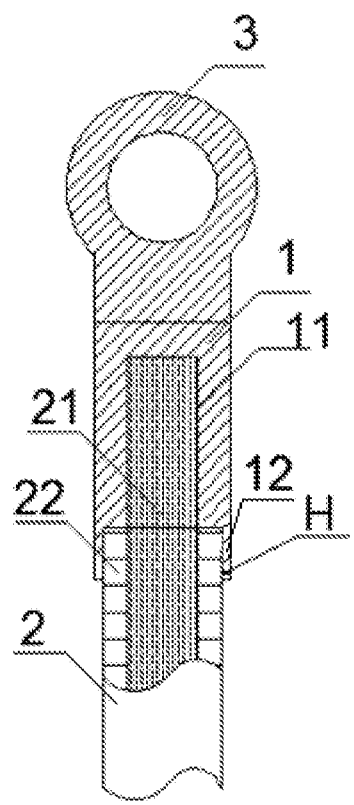
FIG. 4 is a schematic diagram showing a connection structure between a copper-aluminum transition connector structure according to a first preferred embodiment and the aluminum wire of the present invention.

FIG. 4 shows the first copper-aluminum transition connector structure in the present invention, including the copper terminal 3 and at least one aluminum terminal 1 shown in FIG. 1. The copper terminal 3 is fixed on the front end of the first cavity 11 of the aluminum terminal 1. In the first copper-aluminum transition connector structure, the preferred quantity of the aluminum terminal 1 is one.

Specifically, the copper terminal 3 is fixed on the front end of the first cavity 11 by a friction welding, a resistance welding, a laser welding, an electron beam welding, or a pressure welding. Compared with the copper-aluminum transition connector formed by using other welding modes, the welding modes used in the present invention can effectively avoid the galvanic cell reaction between the copper and the aluminum, so as to ensure the mechanical properties and electrical properties of the copper-aluminum transition connector.

Specifically, the connection surface between the copper terminal 3 and the front end of the first cavity 11 is a plane surface. In the welding process, since the end surfaces of the copper terminal and the aluminum terminal can be easily aligned, the implementation of the welding is easy, and a strong solid joint between the copper terminal and the aluminum terminal can be formed with a lower tendency to cause quality problems of welding beads, air holes, etc., which not only greatly decreases the defective index and saves the manufacturing cost, but also facilitates the improvement of the safety and reliability of the copper-aluminum transition connector during use.

Copper-Aluminum Transition Connector Structure 2 (with the Chamfered Structure and the Plane Surface)

Figure 5:
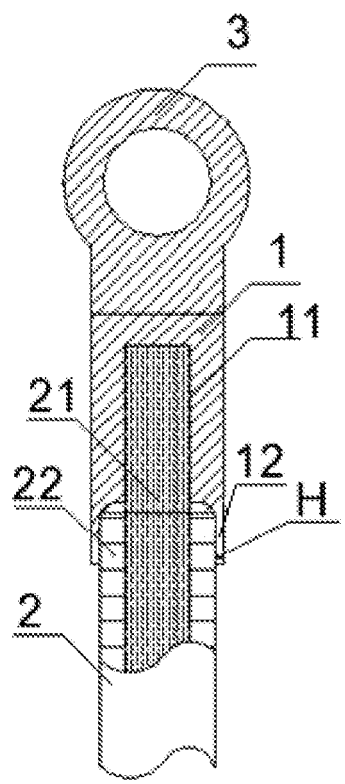
FIG. 5 is a schematic diagram showing a connection structure between a copper-aluminum transition connector structure according to a second preferred embodiment and the aluminum wire of the present invention.

FIG. 5 shows the second copper-aluminum transition connector structure in the present invention, including the copper terminal 3 and at least one aluminum terminal 1 shown in FIG. 2. The copper terminal 3 is fixed on the front end of the first cavity 11 of the aluminum terminal 1. In the second copper-aluminum transition connector structure, the preferred quantity of the aluminum terminals 1 is one. Specifically, the copper terminal 3 is fixed on the front end of the first cavity 11 by the friction welding, the resistance welding, the laser welding, the electron beam welding, or the pressure welding. Compared with the copper-aluminum transition connector formed by other welding modes, the welding modes used in the present invention can effectively avoid the galvanic cell reaction between the copper and the aluminum, so as to ensure the mechanical properties and electrical properties of the copper-aluminum transition connector. Specifically, the connection surface between the copper terminal 3 and the front end of the first cavity 11 is a plane surface. In the welding process, since the end surfaces of the copper terminal and the aluminum terminal can be easily aligned, the implementation of the welding is easy, and a strong solid joint between the copper terminal and the aluminum terminal can be formed with a lower tendency to cause quality problems of welding beads, air holes, etc., which not only greatly decreases the defective index and saves the manufacturing cost, but also facilitates the improvement in the safety and reliability of the copper-aluminum transition connector during use.

Copper-Aluminum Transition Connector Structure 3 (with the Chamfered Structure and the Folded Surface)

The third copper-aluminum transition connector structure of the present invention is solely different from the second copper-aluminum transition connector structure shown in FIG. 5 in that the connection surface between the copper terminal 3 and the front end of the first cavity 11 is a folded surface. With the folded surface, the effective contact area between the copper terminal 3 and the aluminum terminal 1 is greatly increased, which ensures the good electrical conductivity performance, enhances the mechanical properties of the copper terminal and the aluminum terminal during welding, and reduces the resistance at the contact surface of the copper terminal and the aluminum terminal.

Figure 6:
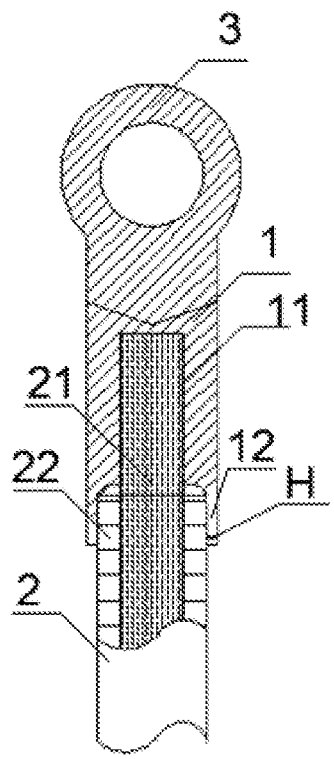
FIG. 6 is a schematic diagram showing a connection structure between a first structure of a copper-aluminum transition connector structure according to a third preferred embodiment and the aluminum wire of the present invention.
Figure 7:
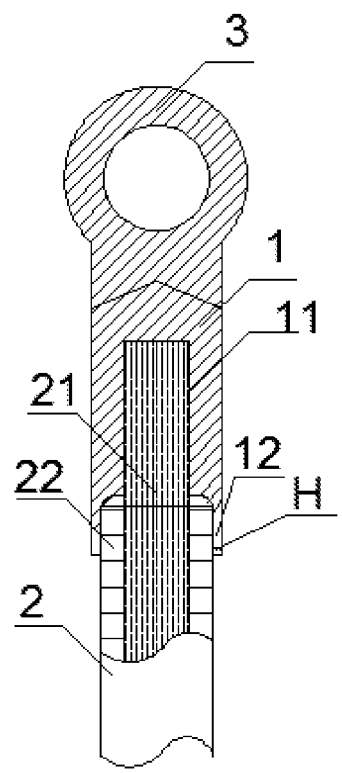
FIG. 7 is a schematic diagram showing a connection structure between a second structure of the copper-aluminum transition connector structure according to the third preferred embodiment and the aluminum wire of the present invention.
Figure 8:
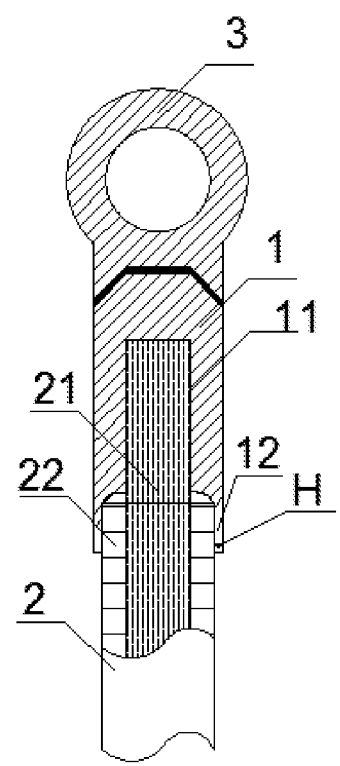
FIG. 8 is a schematic diagram showing a connection structure between a third structure of a copper-aluminum transition connector structure according to the third preferred embodiment and the aluminum wire of the present invention.
Figure 9:
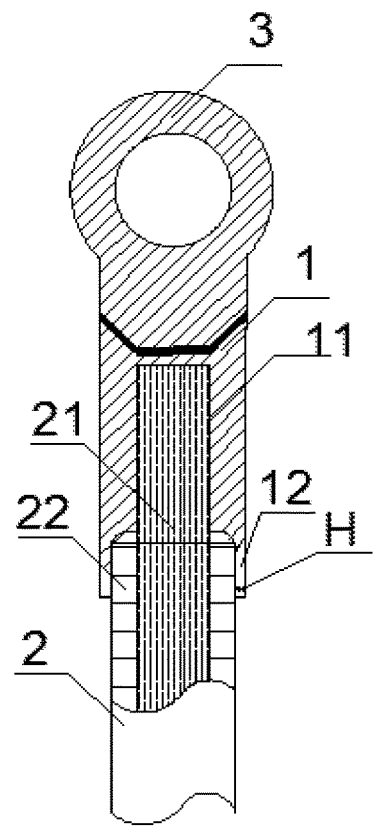
FIG. 9 is a schematic diagram showing a connection structure between a fourth structure of a copper-aluminum transition connector structure according to the third preferred embodiment and the aluminum wire of the present invention.

Moreover, in the present copper-aluminum transition connector structure, the folded surface is V-shaped (as shown in FIG. 6), inverted V-shaped (as shown in FIG. 7), trapezoidal (as shown in FIG. 8), or inverted trapezoidal (as shown in FIG. 9), it should be noted that other than the above-mentioned shapes, the folded surface may be of any other folded shapes capable of increasing the effective contact area between the copper terminal 3 and the aluminum terminal 1.

Copper-Aluminum Transition Connector Structure 4 (with the Opening and the Chamfered Structure)

Figure 10:
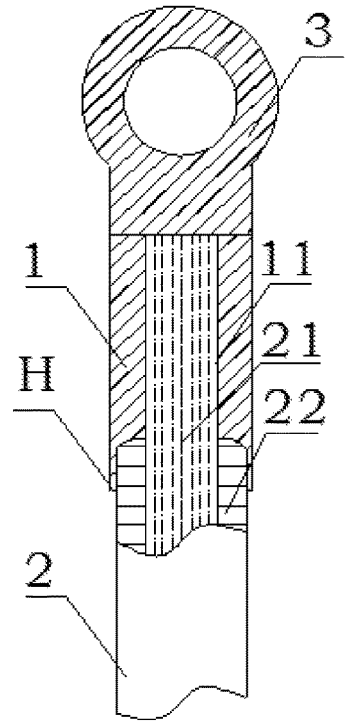
FIG. 10 is a schematic diagram showing a connection structure between a copper-aluminum transition connector structure according to a fourth preferred embodiment and the aluminum wire of the present invention.

FIG. 10 shows the fourth copper-aluminum transition connector structure in the present invention, including the copper terminal 3 and at least one aluminum terminal 1 shown in FIG. 3. The copper terminal 3 is fixed on the front end of the first cavity 11 of the aluminum terminal 1. In the fourth copper-aluminum transition connector structure, the preferred quantity of the aluminum terminals 1 is one.

Specifically, the copper terminal 3 is fixed on the front end of the first cavity 11 by the friction welding, the resistance welding, the laser welding, the electron Team welding, or the pressure welding. Compared with the copper-aluminum transition connector formed by using other welding modes, the welding modes used in the present invention can effectively avoid the galvanic cell reaction between the copper and the aluminum, so as to ensure the mechanical properties and electrical properties of the copper-aluminum transition connector. Specifically, the connection surface between the copper terminal 3 and the outer wall of the front end of the first cavity 11 is a plane surface. In the welding process, since the end surfaces of the copper terminal and the aluminum terminal can be easily aligned, the implementation of the welding is easy, and a strong solid joint between the copper terminal and the aluminum terminal can be formed with a lower tendency to cause quality problems of welding beads, air holes, etc., which not only greatly decreases the defective index and saves the manufacturing cost, but also facilitates the improvement in the safety and reliability of the copper-aluminum transition connector during use.

Copper-Aluminum Transition Connector Structure 5 (with the Hollow Structure and the Opening)

Figure 11:
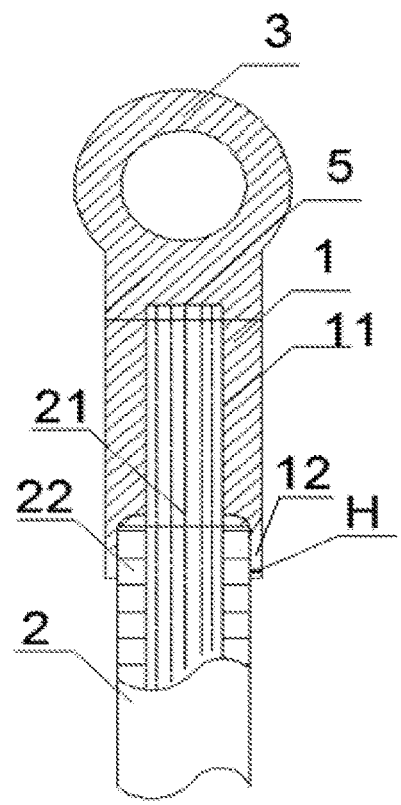
FIG. 11 is a schematic diagram showing a connection structure between a copper-aluminum transition connector structure according to a fifth preferred embodiment and the aluminum wire of the present invention.

The main improvement of the fifth copper-aluminum transition connector structure in the present invention is to configure the copper terminals 3 in the first, second, third, and fourth copper-aluminum transition terminal connector structures with a hollow structure. In this way, besides satisfying the essential requirements for the electrically conductive performance, the consumption of copper materials can be effectively reduced, which is not only helpful in reducing the manufacturing cost of the copper-aluminum transition connector, but also in reducing the weight of the copper-aluminum transition terminal. For example, the copper terminal 3 of the fourth copper-aluminum transition connector is configured with a hollow structure, as shown in FIG. 11, the rear end of the copper terminal 3 is further provided with the entrance 5 for the conductor core 21 of the aluminum wire 2 to get into the interior of the copper terminal 3.

Copper-Aluminum Transition Connector Structure 6 (with the Hollow Structure)

Figure 12:
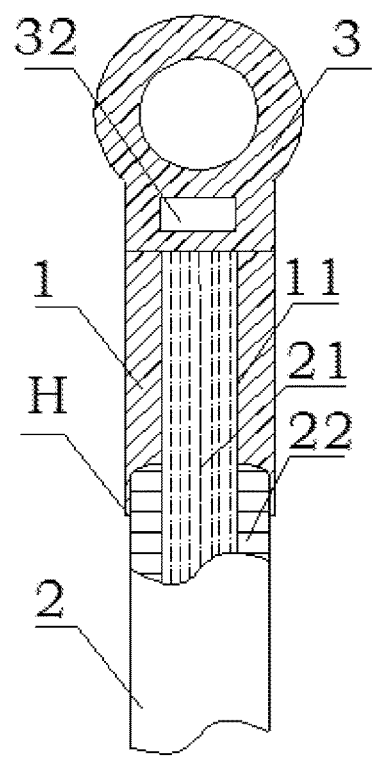
FIG. 12 is a schematic diagram showing a connection structure between a first structure of a copper-aluminum transition connector structure according to a sixth preferred embodiment and the aluminum wire of the present invention.
Figure 13:
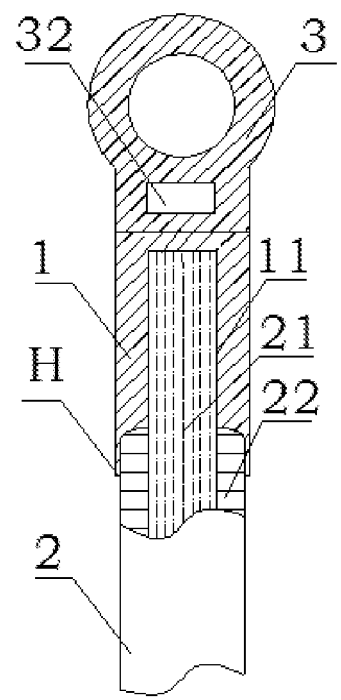
FIG. 13 is a schematic diagram showing a connection structure between a second structure of a copper-aluminum transition connector structure according to the sixth preferred embodiment and the aluminum wire of the present invention.

The main improvement of the sixth copper-aluminum transition connector structure in the present invention is to configure the copper terminals 3 in the first, second, third, and fourth copper-aluminum transition terminal connector structures with a hollow structure. In this way, besides satisfying the essential requirements for the electrically conductive performance, the consumption of copper materials can be effectively reduced, which is not only helpful in reducing the manufacturing cost of the copper-aluminum transition connector, but also in reducing the weight of the copper-aluminum transition terminal. For example, the copper terminals 3 of the second and fourth copper-aluminum transition connectors are configured with a hollow structure, as shown in FIG. 12 and FIG. 13, the specific implementation of the hollow structure is to form the closed hollow cavity 32 inside the copper terminal 3. Preferably, the closed hollow cavity 32 is of a prism, a cylinder, a cylinder with an elliptical cross-section, or a cone shape structure.

Copper-Aluminum Transition Connector Structure 7 (with Multiple Aluminum Terminals and the Plane Surface)

The seventh copper-aluminum transition connector structure in the present invention includes the copper terminal 3 and at least one aluminum terminal 1 shown in FIG. 1, FIG. 2, or FIG. 3. The copper terminal 3 is fixed on the front end of the first cavity 11 of the aluminum terminal 1. In the seventh copper-aluminum transition connector structure, the preferred quantity of the aluminum terminal 1 is more than two.

Figure 14:
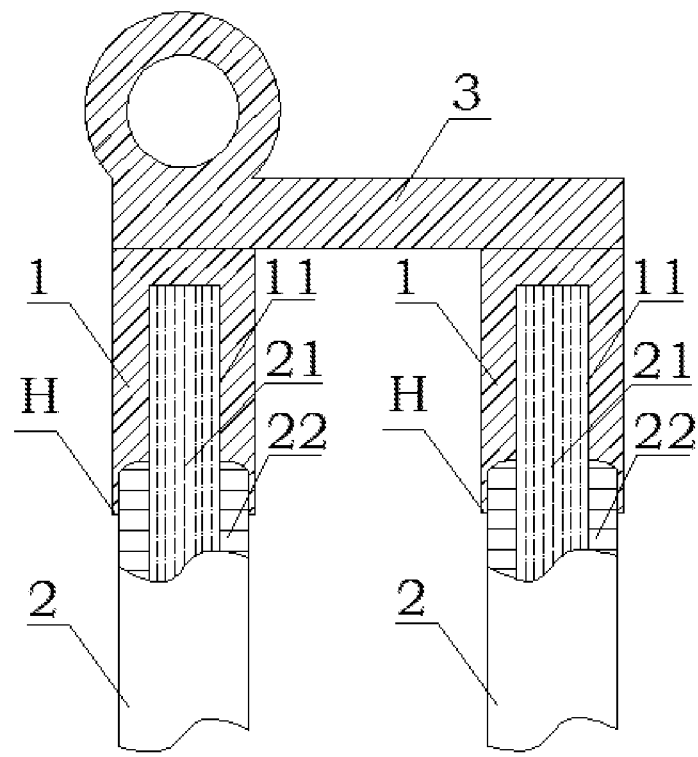
FIG. 14 is a schematic diagram showing a connection structure between a copper-aluminum transition connector structure according to a seventh preferred embodiment and the aluminum wire of the present invention.

Taking the copper terminal 3 and the aluminum terminal 1 shown in FIG. 2 as an example, as shown in FIG. 14, two aluminum terminals 1 are provided. The copper terminal 3 is fixed on the front end of the first cavity 11 by the friction welding, the resistance welding, the laser welding, the electron beam welding, or the pressure welding. Compared with the copper-aluminum transition connector formed by other welding modes, the welding modes used in the present invention can avoid the galvanic cell reaction between the copper and the aluminum, so as to ensure the mechanical properties and electrical properties of the copper-aluminum transition connector.

Further, the connection surfaces between the copper terminal 3 and the front ends of the first cavities 11 of the two aluminum terminals 1 are plane surfaces. In the welding process, since the end surfaces of the copper terminal and the aluminum terminal can be easily aligned, the implementation of the welding is easy, and a strong solid joint between the copper terminal and the aluminum terminal can be formed with a lower tendency to cause quality problems of welding beads, air holes, etc., which not only greatly decreases the defective index and saves the manufacturing cost, but also facilitates the improvement of the safety and reliability of the copper-aluminum transition connector during use.

It should be noted that the quantity of the aluminum terminals 1 of the copper-aluminum transition connector structure is not limited to two, the quantity may also be any positive integer such as three, four, five, etc. One can determine the quantity of the aluminum terminal 1 according to the use requirement in practice, so it is very flexible and convenient for use.

Further, in the present structure, other than solely using the aluminum terminals 1 shown in FIG. 1, FIG. 2, or FIG. 3, the aluminum terminal 1 shown in FIG. 1, FIG. 2 and FIG. 3 can be arbitrary combined according to the specific quantity of aluminum terminals for the copper-aluminum transition connector structure required in practice.

Aluminum-Copper Transition Connector Structure 8 (with Multiple Aluminum Terminals and the Folded Surface)

The eighth copper-aluminum transition connector structure in the present invention includes the copper terminal 3 and at least one aluminum terminal 1 shown in FIG. 1, FIG. 2 or FIG. 3. The copper terminal 3 is fixed on the front end of the first cavity 11 of the aluminum terminal 1. In the eighth copper-aluminum transition connector structure, the preferred quantity of the aluminum terminal 1 is more than two.

Specifically, the copper terminal 3 is fixed on the front end of the first cavity 11 by the friction welding, the resistance welding, the laser welding, the electron beam welding, or the pressure welding.

Specifically, the connection surface between the copper terminal 3 and the front end of the first cavity 11 of the aluminum terminal 1 is a folded surface, which greatly increases the effective contact area between the copper terminal 3 and the aluminum terminal 1, and ensures a good electrical conductivity performance. Moreover, the mechanical properties of the copper terminal and the aluminum terminal during welding is enhanced, and the resistance at the contact surface of the copper terminal and the aluminum terminal is reduced.

Figure 15:
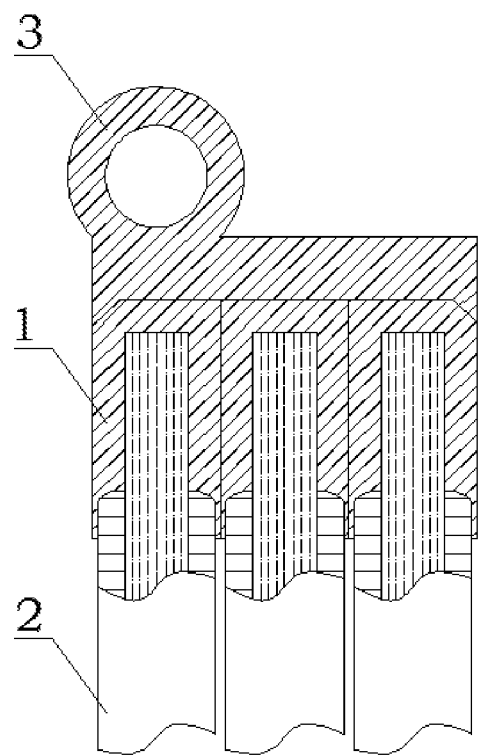
FIG. 15 is a schematic diagram showing a connection structure between a first structure of a copper-aluminum transition connector structure according to an eighth preferred embodiment and the aluminum wire of the present invention.
Figure 16:
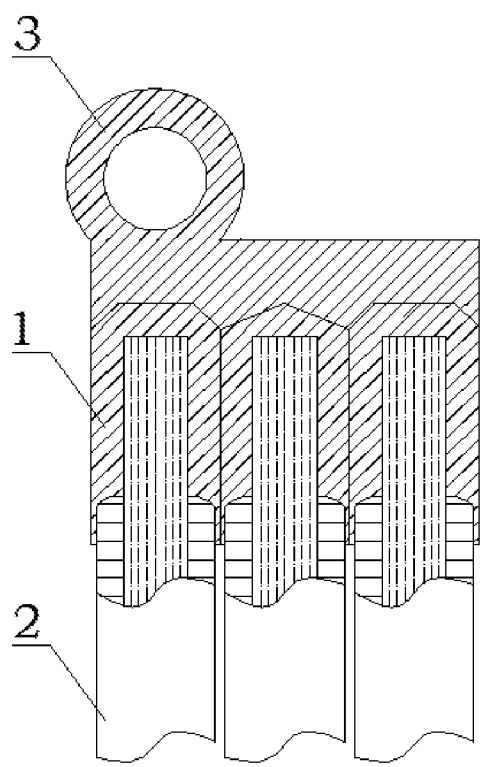
FIG. 16 is a schematic diagram showing a connection structure between a second structure of an aluminum-copper transition connector structure according to the eighth preferred embodiment and the aluminum wire of the present invention.

Further, in the present copper-aluminum transition connector structure, the folded surface is V-shaped or inverted V-shaped. Alternatively, as shown in FIG. 15, the folded surface is of trapezoidal shape or inverted trapezoidal shape. Alternatively, as shown in FIG. 16, the folded surface is of an irregular shape. It should be noted that other than the aforementioned shapes, the folded surface may be any other folded shapes capable of increasing the effective contact area between the copper terminal 3 and the aluminum terminal 1. Further, the quantity of the aluminum terminals 1 of the copper-aluminum transition connector structure is not limited to two, the quantity may also by any positive integer such as three, four, five, etc. One can determine the quantity of the aluminum terminal according to the use requirement in practice, so it is very flexible and convenient for use. Further, other than solely using the aluminum terminals 1 shown in FIG. 1, FIG. 2, or FIG. 3, the aluminum terminal 1 shown in FIG. 1, FIG. 2 and FIG. 3 can be arbitrary combined according to the specific quantity of aluminum terminals for the copper-aluminum transition connector structure required in practice.

Aluminum-Copper Transition Connector Structure 9 (with Multiple Aluminum Terminals, the Plane Surface, Integrated Aluminum Terminals)

Figure 17:
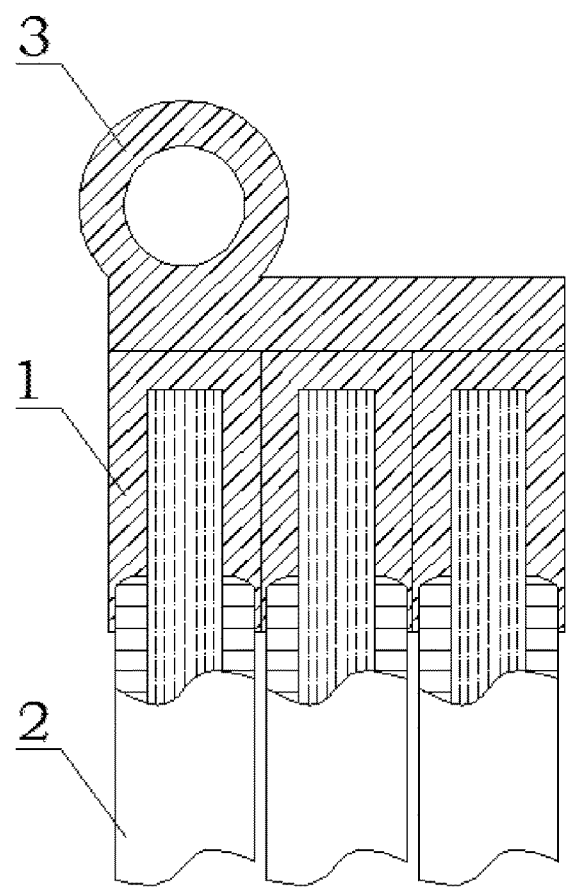
FIG. 17 is a schematic diagram showing a connection structure between an aluminum-copper transition connector structure according to a ninth preferred embodiment and the aluminum wire of the present invention.

FIG. 17 shows the ninth copper-aluminum transition connector structure in the present invention, which is solely different from the seventh copper-aluminum transition connector structure shown in FIG. 14 in that the aluminum terminals 1 are arranged in one row along the horizontal direction, and the side walls of the adjacent aluminum terminals 1 are fixedly connected. Consequently, the two or more aluminum terminals 1 can be welded to the copper terminals 3 at one time without the need of welding the multiple aluminum terminals one by one, which greatly improves the assembling efficiency.

In the present structure, the preferred quantity of the aluminum terminals 1 is three. It should be noted that the quantity of the aluminum terminals 1 of the copper-aluminum transition connector structure is not limited to three, it may also be any positive integer such as two, four, five, etc.

One can determine the quantity of the aluminum terminal 1 according to the use requirement in practice, so it is very flexible and convenient for use. Further, other than solely using the aluminum terminals 1 shown in FIG. 1, FIG. 2, or FIG. 3, the aluminum terminal 1 shown in FIG. 1, FIG. 2 and FIG. 3 can be arbitrary combined according to the specific quantity of aluminum terminals for the copper-aluminum transition connector structure required in practice.

Further, in the copper-aluminum transition connector structure, the connection surface between the copper terminal 3 and the front ends of the first cavities 11 of the aluminum terminals 1 is not limited to the plane surface shown in FIG. 17, it may also be the folded surface shown in FIG. 15 and FIG. 16.

Aluminum-Copper Transition Connector Structure 10 (with Multiple Aluminum Terminals, the Plane Surface, Separated Aluminum Terminals)

Figure 18:
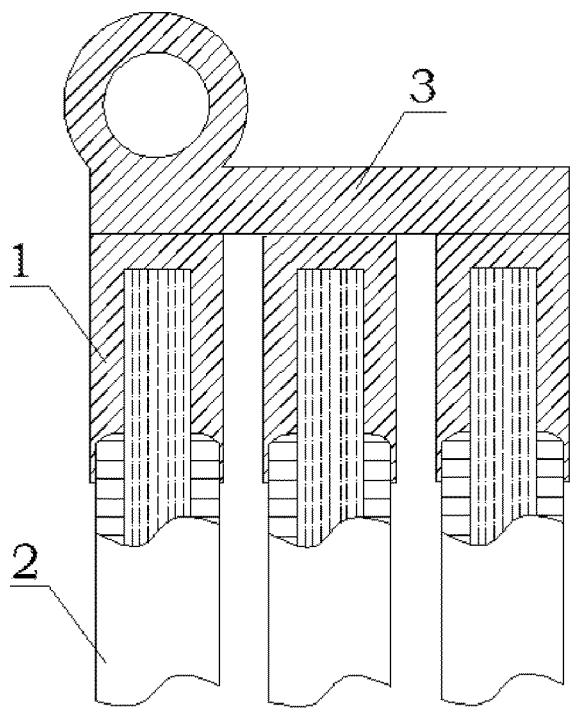
FIG. 18 is a schematic diagram showing a connection structure between an aluminum-copper transition connector structure according to a tenth preferred embodiment and the aluminum wire of the present invention.

FIG. 18 shows the tenth copper-aluminum transition connector structure of the present invention which is solely different from the ninth copper-aluminum transition connector structure shown in FIG. 17 in that the aluminum terminals 1 are arranged in one row along the horizontal direction, and the adjacent aluminum terminals 1 are separated from each other.

Aluminum-Copper Transition Connector Structure 11 (with Multiple Aluminum Terminals, the Plane Surface, Partially Separated Aluminun Terminals)

Figure 19:
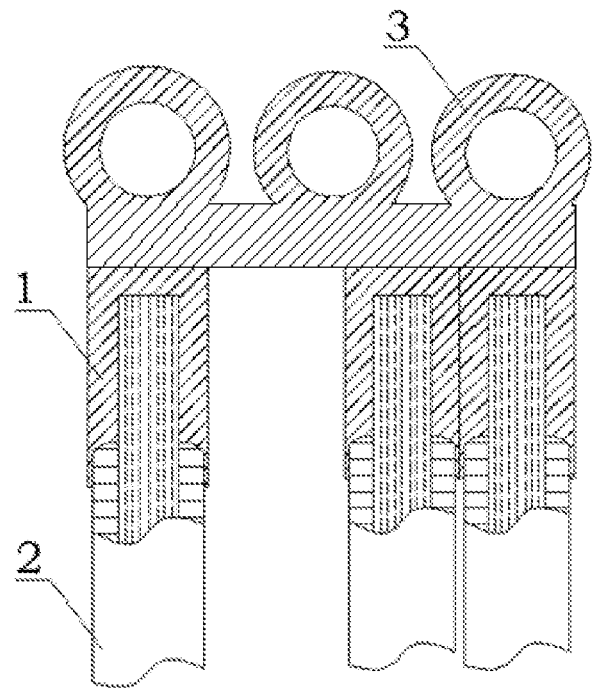
FIG. 19 is a schematic diagram showing a connection structure between an aluminum-copper transition connector structure according to an eleventh preferred embodiment and the aluminum wire of the present invention.

FIG. 19 shows the eleventh copper-aluminum transition connector structure of the present invention, which is characterized in that the ninth copper-aluminum transition connector structure shown in FIG. 17 and the tenth copper-aluminum transition connector structure shown in FIG. 18 are combined. In detail, the aluminum terminals 1 are arranged in one row along the horizontal direction, the side walls of at least two aluminum terminals are connected to form an integrated structure, the other aluminum terminals 1 are separated from each other, and the other aluminum terminals 1 are separated from the integration.

In the present structure, the preferred quantity of the aluminum terminals 1 is three. It should be noted that the quantity of the aluminum terminals 1 of the copper-aluminum transition connector structure is not limited to three, it may also be any positive integer such as four, five, etc. One can determine the quantity of the aluminum terminal 1 according to the use requirement in practice, so it is very flexible and convenient for use. Further, other than solely using the aluminum terminals 1 shown in FIG. 1, FIG. 2, or FIG. 3, the aluminum terminal 1 shown in FIG. 1, FIG. 2 and FIG. 3 can be arbitrary combined according to the specific quantity of aluminum terminals for the copper-aluminum transition connector structure required in practice.

Copper-Aluminum Transition Connector Structure 12 (with the Three-Way Structure)

Figure 20:
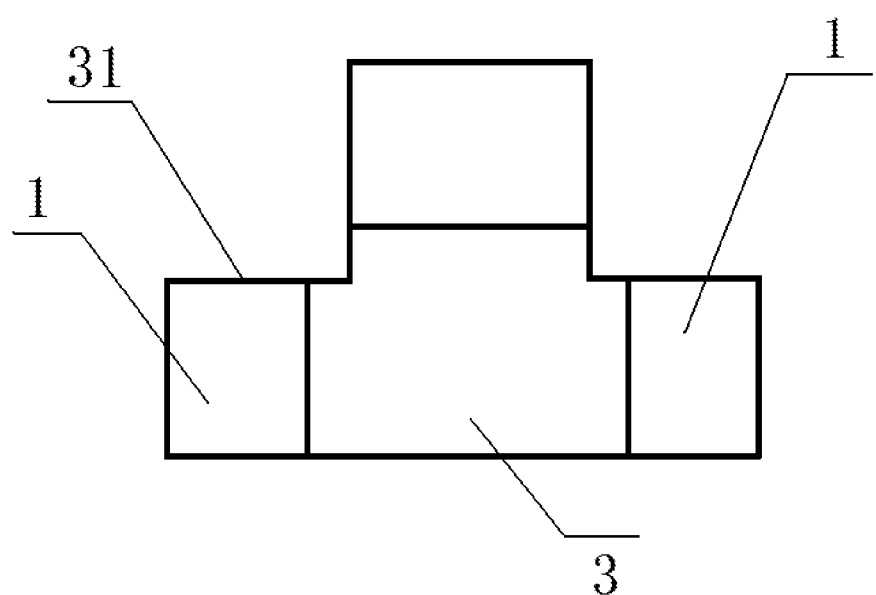
FIG. 20 is a schematic diagram showing the structure of a three-way joint in an aluminum-copper transition connector structure according to a twelfth preferred embodiment of the present invention.

The main improvement of the twelfth copper-aluminum transition connector structure in the present invention is to configure the copper terminal 3 as a three-way joint. As shown in FIG. 20, the three-way joint includes the three end surfaces 31. The quantity of the aluminum terminals 1 is three. The front ends of the first cavities 11 of the three aluminum terminals respectively correspond to the three end surfaces 31 of the three-way joint, and the front end of each first cavity 11 is fixedly connected to the corresponding end surface 31.

In this case, besides effectively reducing the consumption of the copper material, the electrical connection among the three aluminum terminals 1 is realized, which not only reduces the manufacturing cost of the copper-aluminum transition connector, but also reduces the weight of the copper-aluminum transition terminal.

In order to simplify the three-way structure and reduce the manufacturing cost of the copper-aluminum transition connector, the three-way structure in the embodiment is preferably a three-way pipe joint.

The above-mentioned embodiments are merely preferred embodiments of the present invention, and it is improper use these embodiments to limit the scope of the present invention. Any immaterial modifications and substitutions made by those skilled in the art based on the present invention should be considered as falling within the scope of the present invention.

What is claimed is:

1. An aluminum terminal, comprising an insertion cavity for inserting an aluminum wire, wherein the insertion cavity comprises a first cavity with an inner diameter matching with an outer diameter of a conductor core of the aluminum wire, and a second cavity with an inner diameter matching with an outer diameter of an insulation layer of the aluminum wire; a rear end of the first cavity is connected to a front end of the second cavity; wherein a minimum wall thickness of the insertion cavity is not less than $\frac{1}{6}$ times a wall thickness of the insulation layer, wherein an electrically conductive coating layer for providing an electric conduction between the conductor core and the first cavity is provided between an inner wall of the first cavity and the conductor core, the electrically conductive coating layer comprises a carrier portion, the carrier portion includes a resin matrix and an adhesive.

2. The aluminum terminal according to claim 1, wherein a maximum wall thickness of the insertion cavity is not greater than 18 times the wall thickness of the insulation layer.

3. The aluminum terminal according to claim 1, wherein an inner wall of a connection joint between the first cavity and the second cavity has a chamfered structure.

4. The aluminum terminal according to claim 1, wherein the electrically conductive coating layer is composed of 30-90 wt % of the electrically conductive portion, and 10-70 wt % of the carrier portion.

5. The aluminum terminal according to claim 1, wherein the electrically conductive portion comprises at least one selected from the group consisting of gold powder, silver powder, copper powder, aluminum powder, zinc powder, iron powder, cadmium powder, magnesium powder, lithium powder, tin powder, and nickel powder.

6. The aluminum terminal according to claim 1, wherein the electrically conductive portion is composed of a graphite powder.

7. The aluminum terminal according to claim 1, wherein the carrier portion further comprises one or more selected from the group consisting of a cross-linking agent, a coupling agent, and a dispersing agent.

8. The aluminum terminal according to claim 1, wherein a front end of the first cavity is provided with an opening.

9. The aluminum terminal according to claim 8, wherein the electrically conductive coating layer comprises at least 15 wt % of an electrically conductive portion and at most 85 wt % of a carrier portion.

10. A copper-aluminum transition connector, wherein the copper-aluminum transition connector comprises a copper terminal and at least one aluminum terminal according to claim 1, and the copper terminal is fixed on a front end of a first cavity of the aluminum terminal by way of a resistance weld, a laser weld, an electron beam weld or a pressure welded so that reduction and oxidation of the copper and aluminum terminals do not occur.

11. The copper-aluminum transition connector according to claim 10, wherein the copper terminal has a hollow structure.

12. The copper-aluminum transition connector according to claim 10, wherein a connection surface between the copper terminal and the front end of the first cavity is a plane surface.

13. The copper-aluminum transition connector according to claim 10, wherein a connection surface between the copper terminal and the front end of the first cavity is a folded surface.

14. The copper-aluminum transition connector according to claim 10, wherein at least two aluminum terminals are provided, the at least two aluminum terminals are arranged in a row along a horizontal direction, and side walls of adjacent aluminum terminals are fixedly connected.

15. The copper-aluminum transition connector according to claim 10, wherein at least two aluminum terminals are provided, the at least two aluminum terminals are arranged in a row along a horizontal direction, and adjacent aluminum terminals are separated from each other.

16. The copper-aluminum transition connector according to claim 10, wherein the copper terminal has a three-way structure; three aluminum terminals are provided; the front ends of the first cavities of the three aluminum terminals respectively correspond to three end surfaces of the three-way structure, and each front end of the first cavity is fixedly connected to a corresponding end surface.

* * * * *